Figure 1:
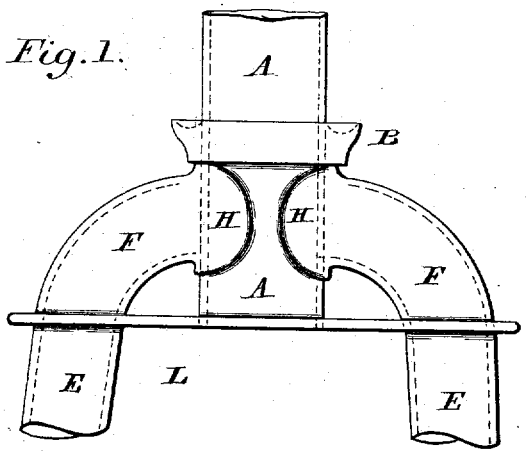

G. F. WASHBURN.

BICYCLE FRAME.

No. 11,449. Reissued Oct. 23, 1894.

Witnesses:
L. P. Slade,
Charles T. Pearce,

Inventor.
George F. Washburn
by his attorney
Edwards S. Beach.

THE NORRIS PETERS CO., PHOTO-LITHO., WASHINGTON, D. C.

UNITED STATES PATENT OFFICE.

GEORGE F. WASHBURN, OF BOSTON, MASSACHUSETTS.

BICYCLE-FRAME.

SPECIFICATION forming part of Reissued Letters Patent No. 11,449, dated October 23, 1894.

Original No. 517,501, dated April 3, 1894. Application for reissue filed May 2, 1894. Serial No. 510,013.

*To all whom it may concern:*

Be it known that I, GEORGE F. WASHBURN, of Boston, in the county of Suffolk and State of Massachusetts, have invented an Improvement in Bicycle-Frames, of which the following is a specification.

The objects of my invention are to facilitate the construction of bicycle frames, of increased strength, and lightness, at a reduced cost; and it consists in the novel and peculiar construction of the front portion of the frame, embracing the fork, which supports the forward end of the main frame connected to the steering wheel, as now in common use, and which invention is hereinafter fully described and specifically set forth in the claims.

In the drawings hereto annexed which form a part of this specification, reference is made.

Figure 2:
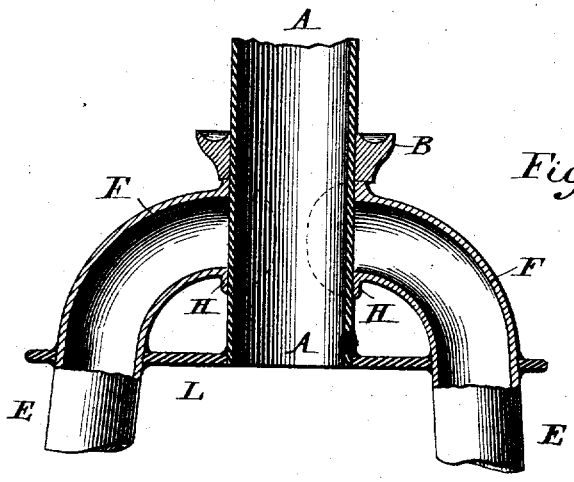

Figure 1 represents a front elevation showing the crotch portion of the fork of the steering-frame constructed according to my invention. Fig. 2 represents a vertical longitudinal section of the same. The upper and lower end portions of the tubular fork-frame, are omitted.

A represents a vertical steel tube having the usual bearing collar B, secured thereon in a permanent manner as heretofore and now in general use for the purpose. It will be understood that the said steel tube A, extends upward a suitable distance and that the upper end portion, is to be provided with the usual steering handles, not shown, being old and well known, and forming no part of my invention, needs no further description. Now as the said vertical tube A, at its lower end portion must necessarily be provided with the opposite legs, E, E, extending downward at each side of the usual steering-wheel, (not shown) and the lower ends having bearings upon the outward ends of the axle thereof, the steering wheel is guided and operated in the usual manner. Thus it will be seen and understood that in actual use there is very great strain upon the said legs E, and particularly at their connections with the lower end portion of the said steel tube A, and in order to secure the greatest strength with a minimum of weight, the said legs E, have been likewise constructed of steel tubes, heretofore. Now in order to connect and secure the legs E, to the tube A, in a very permanent manner, I construct the upper end portions of the said legs E, with a curved, or bent portion F, turned inwardly, and their extreme meeting ends with the said tube A are provided with projecting lips H, which closely fit upon and partially, or nearly surround the outer surface of the steel tube A, and brazed thereto, in a very permanent manner, at their meeting points, as shown in Figs. 1 and 2. These steel tubular portions and their connections are further strengthened by the flat steel yoke L, provided with suitable corresponding holes and brazed upon the lower end of the center tube A and legs E, E, as shown.

In practice, the legs E E are slanted upwardly toward the rider and great strain is frequently brought upon the tube A and attached legs E E both laterally and toward the rider. To combine maximum strength and lightness, the lower end of tube A projects below the opposed ends of the legs and is secured to the yoke L, which, as stated above, is connected with both legs E E. By this construction great rigidity and strength is given to the connected legs and center tube, and this is an important feature of my invention. Heretofore, much difficulty has been experienced by the breaking and bending of the side forks near the fork-crown, owing to the great strain brought upon the parts in the movements of the machine especially when obstructions are met.

The function of the yoke L is to firmly secure the lower end of the tube or upright A and to tie the legs E E together and to the center tube A, thus reducing the strain upon the joints formed at the connections of tubes E E to tube A.

The combination of the yoke with the legs and center tube is broadly new with me, as well as the extension of tube A below the opposed ends of tubes E E.

Having thus described my invention, I claim—

1. In a bicycle frame, the legs E E, having bent portions F, the ends of which are provided with projecting lips H which are brazed to the opposite sides of the tube A, substantially as described and for the purposes set forth.

2. In a bicycle frame, the legs E E, having bent portions F, the ends of which are provided with projecting lips H, which are brazed to the opposite sides of tube A, and a yoke L uniting the tubes E E and tube A, substantially as and for the purpose set forth.

GEORGE F. WASHBURN.

Witnesses:
EDWARD S. BEACH,
L. P. SLADE.